UNITED STATES PATENT OFFICE.

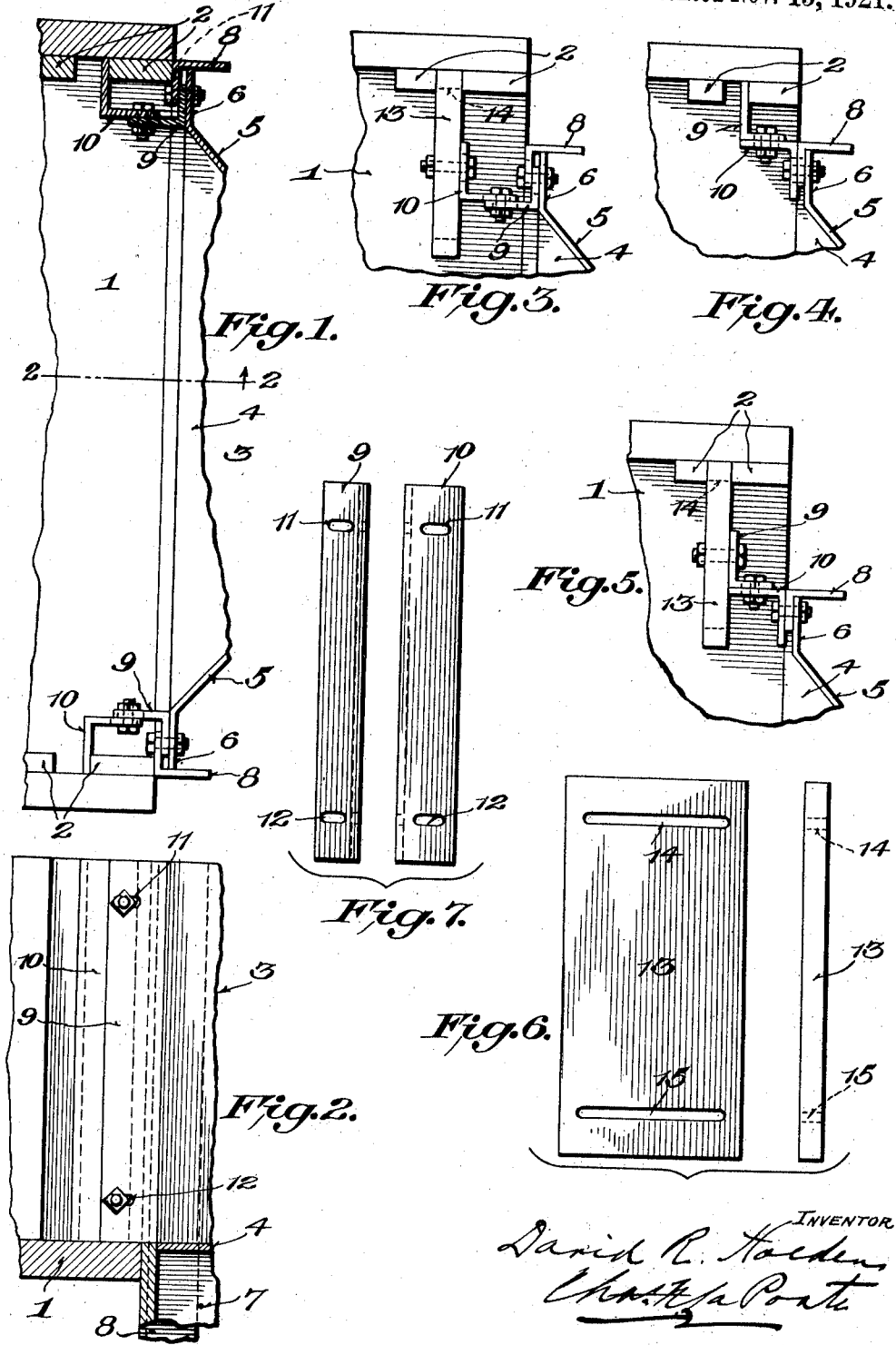

DAVID R. HOLDEN, OF PEORIA, ILLINOIS.

ATTACHING MEANS FOR BROADCAST DISTRIBUTERS.

1,396,843.     Specification of Letters Patent.     Patented Nov. 15, 1921.

Application filed November 7, 1919. Serial No. 336,377.

*To all whom it may concern:*

Be it known that I, DAVID R. HOLDEN, a citizen of the United States, a resident of Peoria, in the county of Peoria and State of Illinois, have invented new and useful Improvements in Attaching Means for Broadcast Distributers, of which the following is a specification.

This invention has reference to a new and improved means for attaching a broadcast distributing attachment to the cleats at the rear end of a wagon box, and is applicable for use whether the distributer is used to distribute fertilizer material, or seed.

The principal object of the invention is to provide an attaching means which is adjustable, thereby making it possible to attach a broadcast distributer to wagon boxes of different widths, while at the same time, closing completely the rear end of the wagon box.

The attaching means is a distinct improvement over that shown and described in Letters Patent issued to me November 19, 1918, No. 1,285,183, to which reference may be had to one form of distributer to which the present invention is applicable.

That the invention may be more fully understood, reference is had to the accompanying drawings, forming a part of the present description, in which:

Figure 1 is a plan view, partly in section, of the rear end of a wagon-box and a part of the distributer shown in my Patent No. 1,285,183, and with my present improvements shown employed for attaching the distributer to the wagon-box;

Fig. 2 is a cross-section on the line 2—2 of Fig. 1;

Fig. 3 is an enlarged plan view of one of the attaching means shown in Fig. 1 and with an additional element to permit the distributer to be attached to wagon-boxes of greater width than shown in Fig. 1;

Fig. 4 is a view similar to Fig. 3, but showing the attaching members only of Fig. 1, these, however, positioned slightly different from Fig. 1 to permit the distributer to be attached to wagon-boxes of greater width than shown in Fig. 1;

Fig. 5 is a view similar to Fig. 3 but showing the additional element of Fig. 3 applied to the arrangement shown in Fig. 4 to permit the distributer to be attached to wagon-boxes of greater width than shown in Fig. 3;

Fig. 6 shows opposite elevations of the additional element shown in Figs. 3 and 5, and Fig. 7 shows opposite elevations of the attaching elements shown in Figs. 1 and 4, and also shown with the additional element in Figs. 1 and 4.

Like characters of reference denote corresponding parts throughout the figures.

The wagon-box is designated 1 and 2 the cleats secured to the inner faces of the side boards thereof, at or near the rear end of said box. The distributing mechanism, only a part of which is shown, and need be referred to, includes the body 3 having a bottom 4 adapted to be positioned approximately flush with the floor of the wagon-box. Said body has the converging side portions 5 terminating in the flanges 6, the whole forming a closure for the rear end of the wagon-box. Supported below the body 3 is a hopper or receptacle 7.

The machine is preferably secured to and supported by the opposite vertically disposed angle-bars 8. These bars extend preferably below the bottom of the wagon-box so that the distributers, not shown, may be located as near the ground as possible.

9 and 10 designate a pair of angle-bars, which may or may not be as long as the cleats 2 of the wagon-box, two pairs being necessary to properly support the machine at the rear end of the wagon-box, see Fig. 1. The bars of each angle-bar are provided with slots 11 and 12 at their upper and lower ends, respectively. The angle-bars 8 have one of their bars near their upper ends, also slotted, as at 11 for the same purposes as the bars 9 and 10, as will be explained.

In Fig. 1, the angle-bars 9 and 10 are bolted respectively to the flanges 6 of the body 3, the angle-bars 8 and to each other, by bolts which pass through the slots 11 and 12, and preferably so that said angle bars 9 and 10 form a substantial U. When the several elements are so secured together, so as to comprise a unitary structure, the angle-bars 9 and 10 open out toward the cleats and to attach the machine thereto it is only necessary to lift the machine high enough so that the angle-bars can pass over the upper end of a cleat and then dropped into position, which will securely hold and support the machine in position, closing the rear end of the box, same as an ordinary end-gate, the material in the box being shoveled into the body 3, without the necessity of lifting, as will be understood. The slots 11 and 12 in the bars 8, 9 and 10 will permit of plenty of adjustment to adapt the attachment of the machine to the wagon-box so as to prevent leakage and to insure a complete closing of the rear end of the wagon-box. Fig. 1 illustrates the supporting elements arranged for attachment to a wagon-box of normal width, which might approximate 36".

It is found necessary at times, to attach the machine to wagon-boxes of different widths, varying from normal, or approximately 36", to something over 40". This may be accomplished in one of three or four different ways. In Fig. 3, I show the same arrangement of the angle bars 9 and 10, as they are shown in Fig. 1, and in addition a plate 13 is provided, attached to the angle-bar 10 by bolts which pass through upper and lower slots 14 and 15 in the plate 13 and the slots 11 and 12 respectively, in the angle-bar 10. This plate may or may not be as long as the cleats and slides up and down between each pair of cleats. The slots 14 and 15, as will be understood will give a wide range of adjustment to the plates 13. In Fig. 4, only the angle-bars 9 and 10 are employed and they are placed back to back or in staggered arrangement, so that one of the bars of the angle-bar 9 may extend out and beyond the angle-bar 8 so as to engage a cleat on the wagon-box. In Fig. 5 the arrangement of the angle-bars 9 and 10 is the same as shown in Fig. 4, with the addition of the plate 13, serving the same purpose previously described in connection with Fig. 3.

The attaching means described, may, as will be understood, be sold, forming elements in a unitary structure, adapted to fit a certain width wagon-box, when the user may change it within the range of its possibilities and adapt it to fit other wagon-boxes; or, the whole attachment, including the elements 9, 10 and 13, may be sold as an attachment for the distributer and the same assembled in either of its several combinations, when it is decided to what width wagon-box it is to be attached.

What I claim is:

1. In a machine of the character described, in combination, a pair of spaced vertically disposed supporting bars, two pairs of vertically arranged attachment bars, one pair for each supporting bar, and means for adjustably securing each pair of attachment bars together and with a supporting bar.

2. In a machine of the character described, in combination, a pair of spaced vertically disposed supporting bars, two pairs of attachment bars, one pair for each supporting bar, a plate adapted to serve as an extension for each of said pairs of attachment bars, means to adjustably secure each plate to a pair of attachment bars, and means for adjustably securing each pair of attachment bars together and with a supporting bar.

3. In a machine of the character described, in combination, a body, means for attaching said body to a wagon-box, comprising two pairs of attachment bars, one pair for each side of said body, said pairs of attachment bars constructed and arranged to be secured together so as to present different shapes, and means for securing each pair of attachment bars together and to said body.

4. In a machine of the character described, in combination, a body, means for attaching said body to a wagon-box, comprising two pairs of attachment bars, one pair for each side of said body, said pairs of attachment bars constructed and arranged to be secured together so as to present different shapes, said attachment bars having corresponding slots, whereby they may be adjusted relatively to each other, and bolts to pass through said slots in said bars to secure the same together.

5. In a machine of the character described, in combination, a body, means for attaching said body to a wagon-box, comprising two pairs of attachment bars, one pair for each side of said body, said pairs of attachment bars constructed and arranged to be secured together so as to present different shapes, a plate adapted to serve as an extension for each of said pairs of attachment bars, means to adjustably secure each plate to a pair of attachment bars, and means for adjustably securing each pair of attachment bars together and to said body.

6. An attachment for a broadcast distributer, comprising a pair of angle-bars having corresponding slots, and arranged to be assembled in different shapes, and bolts to pass through said slots to secure the bars together.

7. An attachment for a broadcast distributer, comprising a pair of angle-bars having corresponding slots, and arranged to be assembled in different shapes, bolts to pass through said slots to secure said bars together, a plate having slots corresponding to the slots in said bars but longer, and bolts to pass through said slots in said plate and one of said bars to secure the same together.

In witness whereof, I have hereunto affixed my hand this 3rd day of November, 1919.

DAVID R. HOLDEN.